(12) United States Patent
Underhill et al.

(10) Patent No.: US 8,107,317 B2
(45) Date of Patent: Jan. 31, 2012

(54) TECHNIQUE AND SYSTEM FOR PERFORMING A CROSS WELL SURVEY

(75) Inventors: William B. Underhill, Richmond, TX (US); Scott W. Leaney, Katy, TX (US); David Gerez, Belfast (GB); Alfredo Fayard, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1102 days.

(21) Appl. No.: 11/693,435

(22) Filed: Mar. 29, 2007

(65) Prior Publication Data

US 2008/0159075 A1 Jul. 3, 2008

Related U.S. Application Data

(60) Provisional application No. 60/882,368, filed on Dec. 28, 2006.

(51) Int. Cl.
*G01V 1/00* (2006.01)
(52) U.S. Cl. ............. 367/25; 181/101; 181/108; 702/14
(58) Field of Classification Search .................... 367/25; 181/101, 108; 702/14
See application file for complete search history.

(56) References Cited

U.S. PATENT DOCUMENTS

| | | | |
|---|---|---|---|
| 3,733,584 A | 5/1973 | Pelton et al. | |
| 5,062,086 A | 10/1991 | Harlan | |
| 5,481,501 A * | 1/1996 | Blakeslee et al. | ............... 367/57 |
| 5,596,548 A | 1/1997 | Krebs | |
| 5,999,489 A | 12/1999 | Lazaratos | |
| 6,002,642 A | 12/1999 | Krebs | |
| 6,014,342 A | 1/2000 | Lazaratos | |
| 6,035,256 A | 3/2000 | Stankovic | |
| 6,067,340 A | 5/2000 | Eppstein | |
| 6,112,155 A | 8/2000 | Pham | |
| 6,179,084 B1 | 1/2001 | Yamamoto et al. | |
| 6,253,156 B1 | 6/2001 | Bui-Tran et al. | |
| 6,263,283 B1 * | 7/2001 | Snider et al. | ...................... 702/6 |
| 6,269,310 B1 | 7/2001 | Washbourne | |
| 6,388,947 B1 | 5/2002 | Washbourne | |
| 6,778,907 B1 * | 8/2004 | Washbourne et al. | ............ 702/6 |

(Continued)

FOREIGN PATENT DOCUMENTS

WO 2004/086093 10/2004

OTHER PUBLICATIONS

N.R. Warpinski, R.B. Sullivan, J.E.Uhl, C.K. Waltman, S.R. Machovoe, Improved Microseismic Fracture Mapping Using Perforation Timing Measurements for Velocity Calibration, SPE 84488, Oct. 5-8, 2003, pp. 1-11, Society of Petroleum Engineers, Richardson, TX, USA.

*Primary Examiner* — Timothy Edwards, Jr.
(74) *Attorney, Agent, or Firm* — Myron K. Stout; Rachel E. Greene; David Cate

(57) ABSTRACT

A technique includes providing a source in a first well and a seismic receiver in a second well to detect a seismic event that is caused by the source. The technique includes referencing clocks in the source and receiver to a common reference time frame and determining a time in the reference time frame at which the seismic source generates the seismic event.

16 Claims, 4 Drawing Sheets

U.S. PATENT DOCUMENTS

| | | |
|---|---|---|
| 7,453,768 B2 * | 11/2008 | Hall et al. ............... 367/82 |
| 7,602,669 B2 * | 10/2009 | Korneev et al. ............ 367/31 |
| 2003/0125879 A1 * | 7/2003 | Khan et al. ............... 702/14 |
| 2004/0068376 A1 * | 4/2004 | Aronstam ................. 702/14 |
| 2006/0077757 A1 * | 4/2006 | Cox et al. ................ 367/25 |
| 2006/0146646 A1 * | 7/2006 | Fanini et al. ............. 367/27 |
| 2006/0203614 A1 | 9/2006 | Harmon |
| 2009/0217074 A1 * | 8/2009 | Nichols et al. ............ 713/401 |

* cited by examiner

TECHNIQUE AND SYSTEM FOR PERFORMING A CROSS WELL SURVEY

This application claims the benefit under 35 U.S.C. §119 (e) to U.S. Provisional Application Ser. No. 60/882,368, entitled, "TECHNIQUE AND SYSTEM FOR PERFORMING A CROSS WELL SURVEY," which was filed on Dec. 28, 2006, and is hereby incorporated by reference in its entirety.

BACKGROUND

The invention generally relates to a technique and system for performing a cross well survey.

Well stimulation, injection and production can lead to a change in the stress state of the formation, resulting in rock failure and stress release. This stress release can generate both compressional and shear-radiated seismic energy. The nature and characteristics of detected seismic energy can reveal information about the failure mechanism and the amount of stress released.

By detecting a microseismic event by one or more multi-component sensors, it is possible to triangulate the location of the event. This can reveal information about the geometry and extent of the pressure disturbance, the geometry of fracture growth, and the principal stress direction of the formation.

Microseismic hydraulic fracture monitoring, in general, has two principal applications. The first application is real-time microseismic event detection and location for real-time hydraulic fracture monitoring. This enables the well service stimulation specialist to monitor and adjust the hydraulic fracture operation based on the observed and modeled extent of fracture growth. The second application is post job analysis and interpretation. The microseismic event data may be processed and interpreted to better understand the mechanisms and geometry of fracture growth and the current stress state of the formation. The specialist can use this information in the planning of further well stimulation and possible in-fill drilling for enhanced production.

The analysis and processing of microseismic data requires high fidelity recording of the microseismic events as a function of elapsed time; and detailed knowledge of the subsurface velocities, compression and shear, and the amount and nature of velocity anisotropy in the rock layer. One way to determine the amount and nature of velocity anisotropy is through the use of walkaway vertical seismic profile (VSP) measurements. However, these measurements may be too costly or may be impractical for a rugged terrain. Additionally, velocity inversions in the subsurface may additionally limit arrival angles and so not give a complete picture of the anisotropy present in the subsurface.

Thus, there exists a continuing need for better ways to build and/or calibrate a seismic velocity model.

SUMMARY

In an embodiment of the invention, a technique includes providing a seismic source in a first well and a seismic receiver in the second well to detect a seismic event that is caused by the source. The technique includes referencing clocks in the source and receiver to a common reference time frame and determining a time in a reference time frame at which seismic source generates the seismic event.

In another embodiment of the invention, a system includes a first well and a second well. The system includes a first tool adapted to be run into the first well and includes at least one seismic source and a first downhole clock. The system includes a second tool adapted to be run into the second well and includes at least one seismic receiver and a second downhole clock. The system includes circuitry to reference the first and second downhole clocks to a reference clock to determine a time at which the first tool generates a seismic event.

Advantages and other features of the invention will become apparent from the detailed description, drawing and claims.

DETAILED DESCRIPTION

Techniques and systems are described herein to perform a cross well survey for purposes of building and/or calibrating a seismic velocity model. The cross well survey, in general, is performed by creating a seismic event in one well, called a "treatment well" and measuring the event in another well, called a "monitoring well." In order for the cross well survey to be effective, the recording of the seismic event by a tool in the treatment well must be in close synchronization with the recording of the seismic event by another tool in the monitoring well. In other words, the time at which the seismic event originates must be known in order to obtain a sufficient velocity model. As described herein, a system that is depicted in FIG. 1 is constructed in accordance with embodiments of the invention to precisely indicate a time origin for each seismic event.

Figure 1:
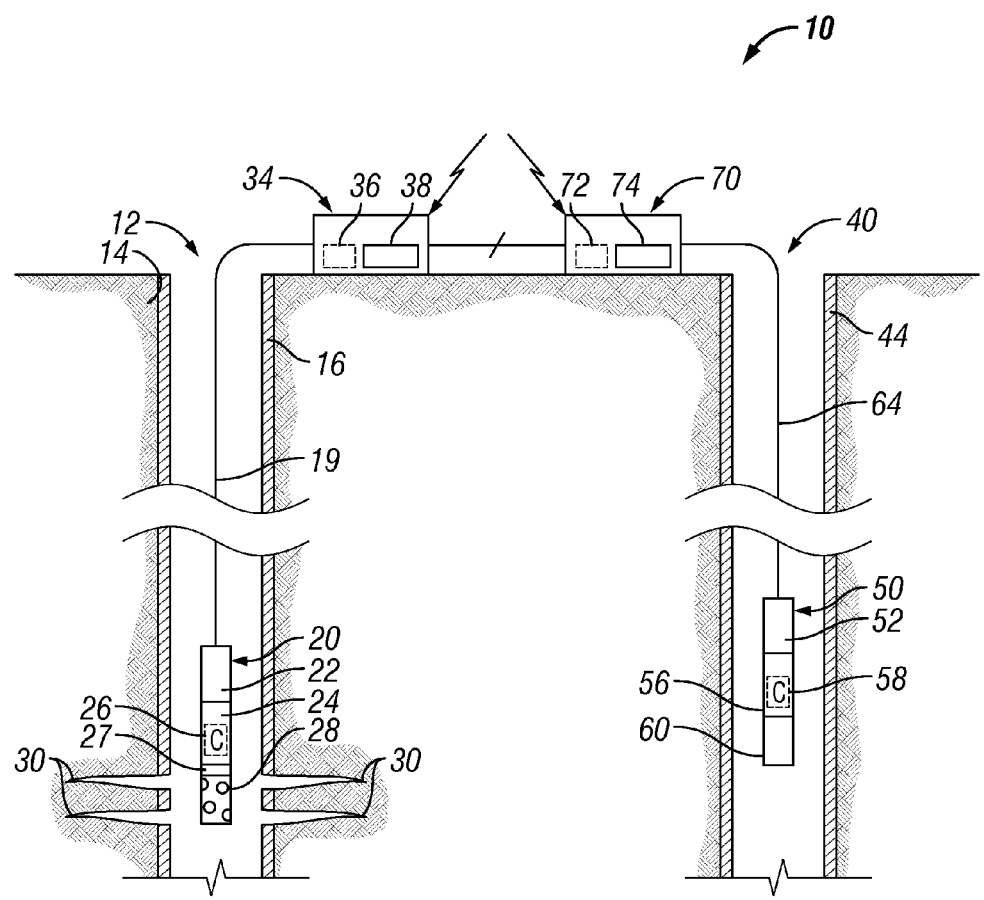
FIG. 1 is a schematic diagram of a system of treatment and monitoring wells according to an embodiment of the invention.

In general, FIG. 1 depicts a system 10, which includes a treatment well 12 and a monitoring well 40. Seismic monitoring equipment may be run into the monitoring well 40 for purposes of monitoring an ongoing fracturing operation in the treatment well 12 (i.e., for purposes of microseismic hydraulic fracture monitoring). However, before such monitoring may occur, a seismic velocity model that characterizes the formation(s) between the wells 12 and 40 is first developed.

As depicted in FIG. 1, in accordance with some embodiments of the invention, the wells 12 and 40 may be cased and thus, may be lined by respective casing strings 16 and 44, respectively. However, it is noted that the system and techniques that are disclosed herein may be used with uncased wellbores, in accordance with other embodiments of the invention. Furthermore, although the wells 12 and 40 are depicted as being subterranean wells, it is noted that in accordance with other embodiments of the invention, the systems and techniques that are disclosed herein may be applied to subsea wells. Thus, many variations are possible and are within the scope of the appended claims.

For purposes of performing a cross well survey, a seismic source tool 20 is run into the treatment well 12 to a known position. When activated, the seismic source tool 20 produces a "shot," or seismic event, which is measured by a seismic receiver tool 50 that is located in the monitoring well 40. More specifically, the seismic energy that is recorded by the seismic receiver tool 50 is the result of a seismic wave that is generated by the tool 20, after having traveled through and been reflected within the surrounding formation(s). The recorded seismic energy is a function of the formation response, the sensor response and the response of the recording instrument.

In accordance with some embodiments of the invention, the tools 20 and 50 may be wireline tools that are run downhole on wirelines 19 and 64, respectively. It is noted that these conveyance mechanisms are merely examples, as other conveyance mechanisms (such as a tubular string, for example) may be used in accordance with other embodiments of the invention.

The accuracy with which it is possible to triangulate the location of a detected microseismic event depends on the source and receiver geometry and the quality and signal-to-noise ratio (SNR) of the measurement. The multi-well monitoring technique used in the system 10 potentially offers improved location accuracy and better estimation of the source mechanism, as compared to a single well monitoring arrangement.

For purposes of locating seismic events by three component hodogram analysis, the tool orientation must be determined. A microseismic survey uses the recording of a calibration orientation shot. By recording and analyzing a high quality cross well shot, the tool orientation may be accurately computed.

The recorded cross well shots also provide velocity model calibration information. Optimal calibration requires the ability to know the time origin of each seismic event that is generated by the seismic source tool 20. In accordance with embodiments of the invention described herein, for purposes of determining the absolute time at which the tool 20 generates a seismic event, the system 10 references clocks 26 and 58 of the tools 20 and 50, respectively, to a reference clock signal. Thus, although the wells 12 and 40 may be associated with independent surface systems 34 and 70, respectively, operations of the tools 20 and 50 are referenced to the same time frame. Due to this technique, the absolute time that the tool 20 initiates a seismic event is known, thereby allowing optimal velocity model calibration.

Figure 2:
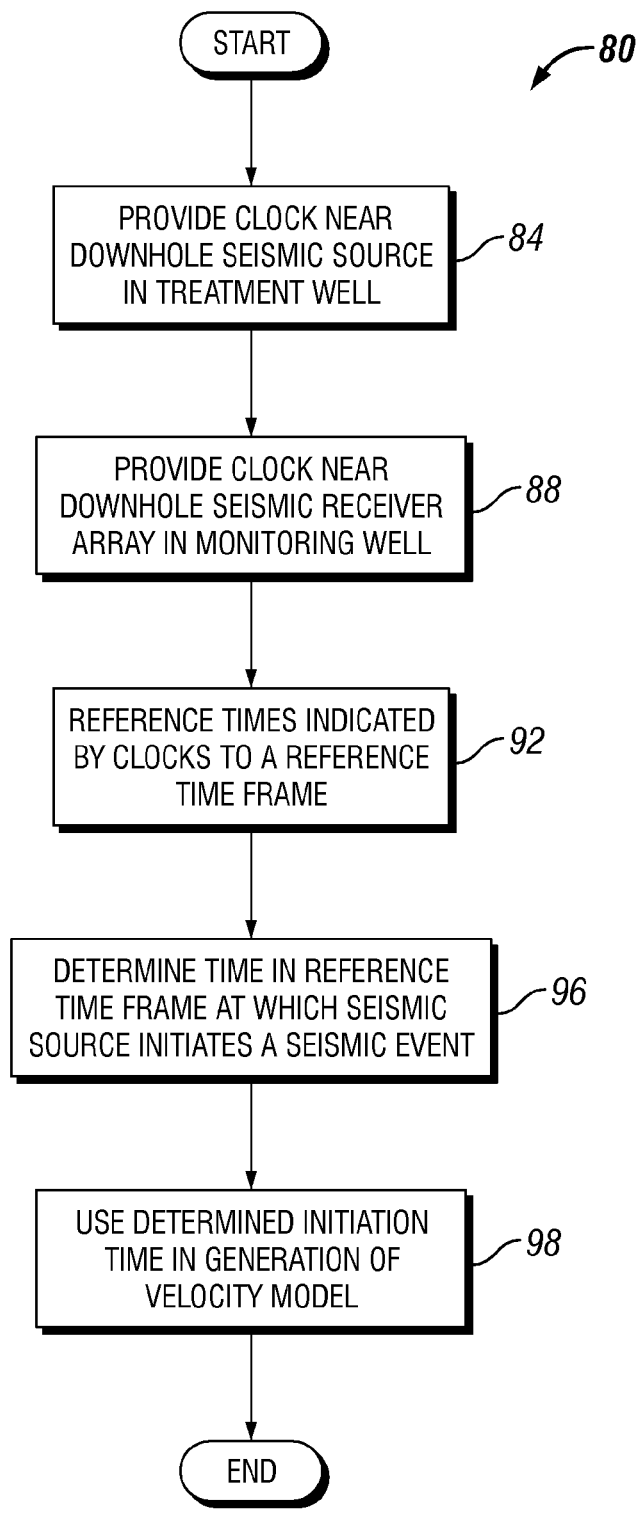
FIG. 2 is a flow diagram depicting a technique to build a velocity model from at least one seismic source and at least one seismic receiver according to an embodiment of the invention.

More specifically, referring to FIG. 2 in conjunction with FIG. 1, in accordance with some embodiments of the invention, a technique 80 includes providing (block 84) a clock near a downhole seismic source in a treatment well and providing (block 88) a clock near a downhole seismic receiver array in a monitoring well. Times that are indicated by the clocks are referenced to a reference time frame, pursuant to block 92. Subsequently, a determination is made of the time in the reference time frame at which the seismic source initiates a seismic event, pursuant to block 96. The determined initiation time is used in the generation of the velocity model, pursuant to block 98.

Referring back to FIG. 1, the use of cross well seismic monitoring overcomes traditional challenges in developing an accurate and suitable velocity model. For example, it has traditionally been difficult to obtain data from which to estimate the formation shear velocity. More particularly, microseismic events typically have a bandwidth of tens of Hertz up to hundreds of Hertz. This is a relatively high frequency signal as compared to seismic and relatively low when compared to sonic. This implies a wavelength of order of a few meters to tens of meters. Any velocity model should be on a similar scale as the dominant wavelength. For microseismic applications, velocity models derived from seismic measurements will often be too coarse, and sonic log derived models need to be smoothed or blocked to match the dominant wavelength.

For a single well monitoring array, or in the case of a multi-well experiment, the recorded microseismic arrivals will often follow an oblique ray path. The formation velocity may be directionally dependent, or anisotropic, which is particularly the case for some shale formations. Where the information is available, anisotropy is accounted for in the model. A calibrated anisotropic velocity model can be constructed from sonic log and checkshot vertical seismic profile (VSP) data. Generally compressional and shear information is derived from the calibrated/extended sonic logs, and anisotropy parameters are estimated from offset or walkaway VSP data. The offset or walkaway VSP method of determining anisotropy is a well established method (or set of methods) to determine velocity information over a wide range of propagation angles, as is needed for robust microseismic event location. Aside from being perhaps too expensive in some cases, there are at least two scenarios were it may become less effective: a) when the terrain is rugged, limiting accessibility and causing seismic static issues; and b) when there is a velocity inversion (e.g. low-velocity shale beneath high-velocity sandstone) preventing any nearly horizontal rays (propagation).

Thus, the cross-well system and technique described herein overcomes the traditional challenges, especially when the time at which the seismic source tool 20 generates the seismic event is known.

Turning to the more specific details, in accordance with some embodiments of the invention, the clocks 26 and 58 are counters, which each indicate a current time for its respective tool 20 or 50. In accordance with some embodiments of the invention, the tool 20, 50 communicates an indication of its time to the associated surface system. In this regard, in accordance with some embodiments of the invention, the tool 20 periodically communicates (via its telemetry interface 20 and the wireline 19) an indication of its time to the surface system 34. Likewise, periodically, the tool 50 communicates (via its telemetry interface 52 and the wireline 64) an indication of its time to the surface system 70.

The surface systems 34 and 70 are, in general, independent from each other. However, each surface system 34, 70 receives a global positioning satellite (GPS) signal, a signal that contains a universal time signal, which is stored as a "UTC" count in the surface system 34, 70. The UTC count thus indicates the universal time for the surface system 34, 70. Thus, the surface systems 34 and 70 in accordance with embodiments of the invention, contain UTC counters 36 and 72, which are synchronized to the received UTC time.

In accordance with some embodiments of the invention, each surface system 34 references the associated downhole tool count with a job time counter 38 (for the surface system 34) or 74 (for the surface system 70). The JTC 38, 74 is, in general, synchronized in time and frequency to the associated downhole tool time. Thus, the JTC 38 is synchronized to the clock 26, and the JTC 74 is synchronized to the clock 58. The surface system 34, 70, in turn, references the time indicated by the job time counter 38, 74 to the UTC time. As a result, times that are communicated between the otherwise independent surface systems 34 and 70 are referenced to the same reference time frame.

As a more specific example, in accordance with some embodiments of the invention, the seismic source tool 20 may contain a perforating gun 28, which may serve a dual function of forming corresponding perforation tunnels (such as exemplary perforation tunnels 30) into a surrounding formation and generating seismic events. When a set of perforating charges of the perforating gun 28 fire, this creates a seismic event, which may be detected by at least one sensor 27 of the tool 20, as well as a sensor array of the seismic receiver tool 50. In accordance with some embodiments of the invention, the tool 20 communicates with the surface system 34 for purposes of indicating a UTC time for the firing of the perforating gun 28. The UTC firing time may then be communicated from the surface system 34 to the surface system 70, which then communicates the UTC firing time to the tool 50. It is noted that the surface system 70 may re-reference the UTC time to the time frame of the tool 50, in accordance with some embodiments of the invention. Thus, the absolute time of firing is known by both surface systems 34 and 70; and the tool 50 may start its recording at the UTC firing time.

It is noted that the seismic source tool 20 may use a device other than a perforating gun to generate the seismic event, in accordance with other embodiments of the invention. In this regard, the tool 20 may use a non-perforating charge or another seismic source. Furthermore, the seismic source tool 20 may use non-penetrating shaped charges to generate seismic events. Thus, many variations are possible and are within the scope of the appended claims.

Turning now to more specific details, in accordance with some embodiments of the invention, asynchronous communications are used in the well telemetry for purposes of achieving required high data rates. With asynchronous telemetry, the downhole tool bus and cable telemetry are each totally asynchronous. Therefore, there is no synchronous timing signal. Instead, downhole telemetry interfaces 22 and 52 and the surface systems 34 and 70, respectively, synchronize their clocks regularly, not only the frequency but also to the clock counter value. More particularly, in accordance with some embodiments of the invention, the telemetry interface 22, 52 generates "frame start command" at every lower 12-bit rollover (as an example) of its associated clock 26, 56. This may be every 16 milliseconds (as an example). Upon receiving this command, a controller of the tool 20, 50 generates a FRAME pulse. By looking at this pulse, the downhole tool 20, 50 knows (at least) the rollover of 12-bit counter, which is both in both the downhole and surface telemetry components. With this method, clock counter synchronization is no worse than +/−32 microseconds (as an example).

Regularly upon detecting the FRAME pulse, the downhole telemetry interface 22, 52 sends an uplink message containing its own clock value to the surface of the well. Surface software executing on the surface systems 34 and 70 receives this, along with a time stamp. By this, surface software can correlate the downhole tool's clock counter and the JTC clock counter.

In accordance with some embodiments of the invention, the seismic tool 20 may be digitally-controlled from the surface and may be placed accurately at any depth. Furthermore, the seismic source tool 20 may be repositioned for repeat source activation at multiple depths without requiring retrieval from the well. The sensor 27 of the seismic source tool 20 may be used to measure source firing time and may be an accelerometer or hydrophone, in accordance with some embodiments of the invention. Furthermore, the seismic source tool 20 may be capable of orienting the perforating gun 28 to control the source radiation pattern and propagating modes. Furthermore, depending on the particular embodiment of the invention, the seismic source tool 20 may have other sensors to acquire other data, such as wellbore pressure and/or temperature.

The sensor 27 may be used in accordance with some embodiments of the invention, to detect the source activation time. In this regard, the signal that is recorded by the sensor 27 may be in the form of a peak, or spike. The beginning of the spike, in turn, may be identified for purposes of precisely identifying the source activation time. It is noted that the source activation time may be identified using other techniques, in accordance with other embodiments of the invention. For example, in accordance with some embodiments of the invention, the source activation time may be detected through acceleration of a tool string that is caused by source detonation; a pressure peak in the wellbore, which is caused by source activation; or the loss of electrical continuity as a dedicated sensing wire is destroyed by the detonation. As an alternative to a timing measurement following the event, a firing pulse may be transmitted at a predetermined time to an initiator with precisely-controlled timing properties. Thus, many variations are possible and are within the scope of the appended claims.

In accordance with some embodiments of the invention, one of the surface systems 74 and 70 or a separate system may invert the recorded data and build anisotropic velocity models. To perform this modeling, the system may perform the following work flow. First, dipole sonic logs may be loaded and from these logs, a smooth elastic model may be developed. The perforation shot times may then be read; and then, a travel time inversion technique, which is specialized for hydraulic fracturing monitoring geometry, is applied for purposes of developing the velocity model.

Figure 3:
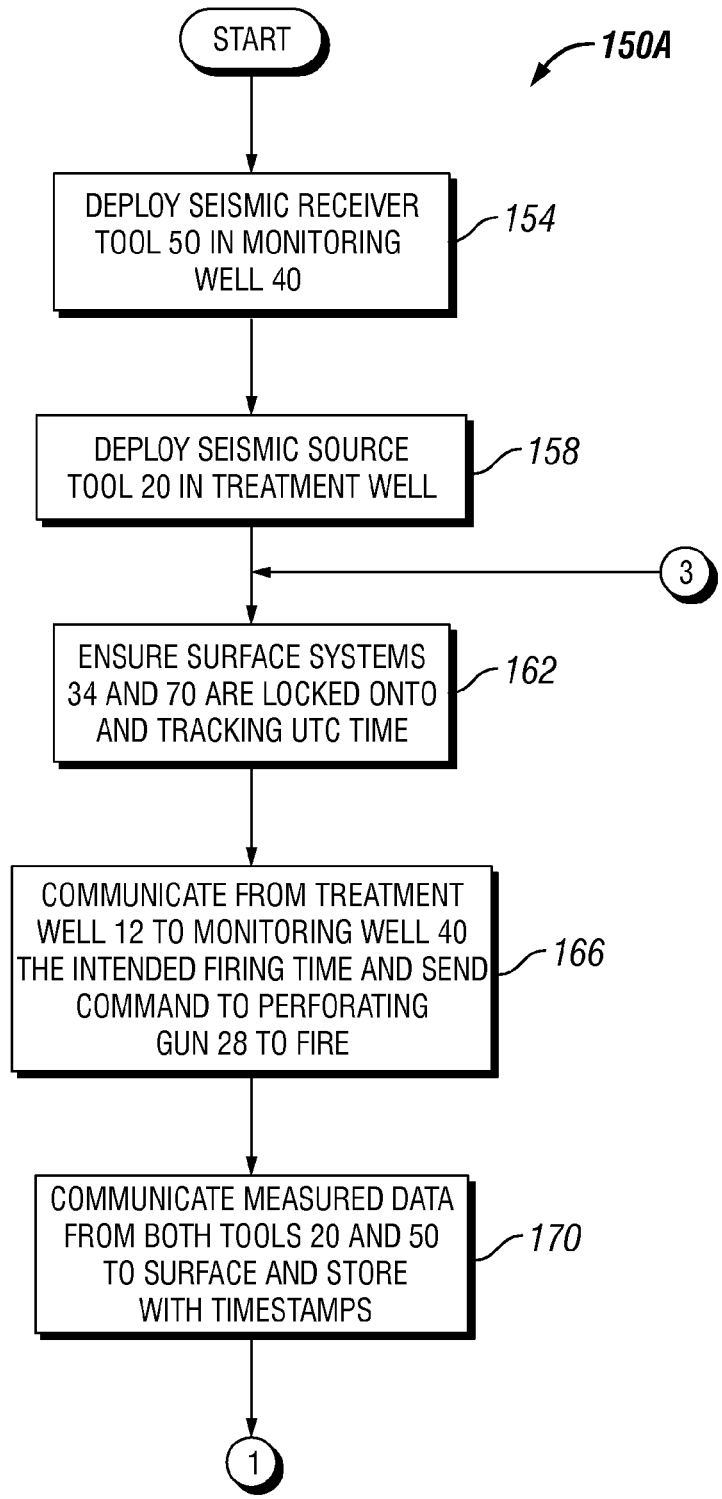
FIGS. 3 and 4 are flow diagrams depicting a more detailed technique to build a velocity model according to an embodiment of the invention.
Figure 4:
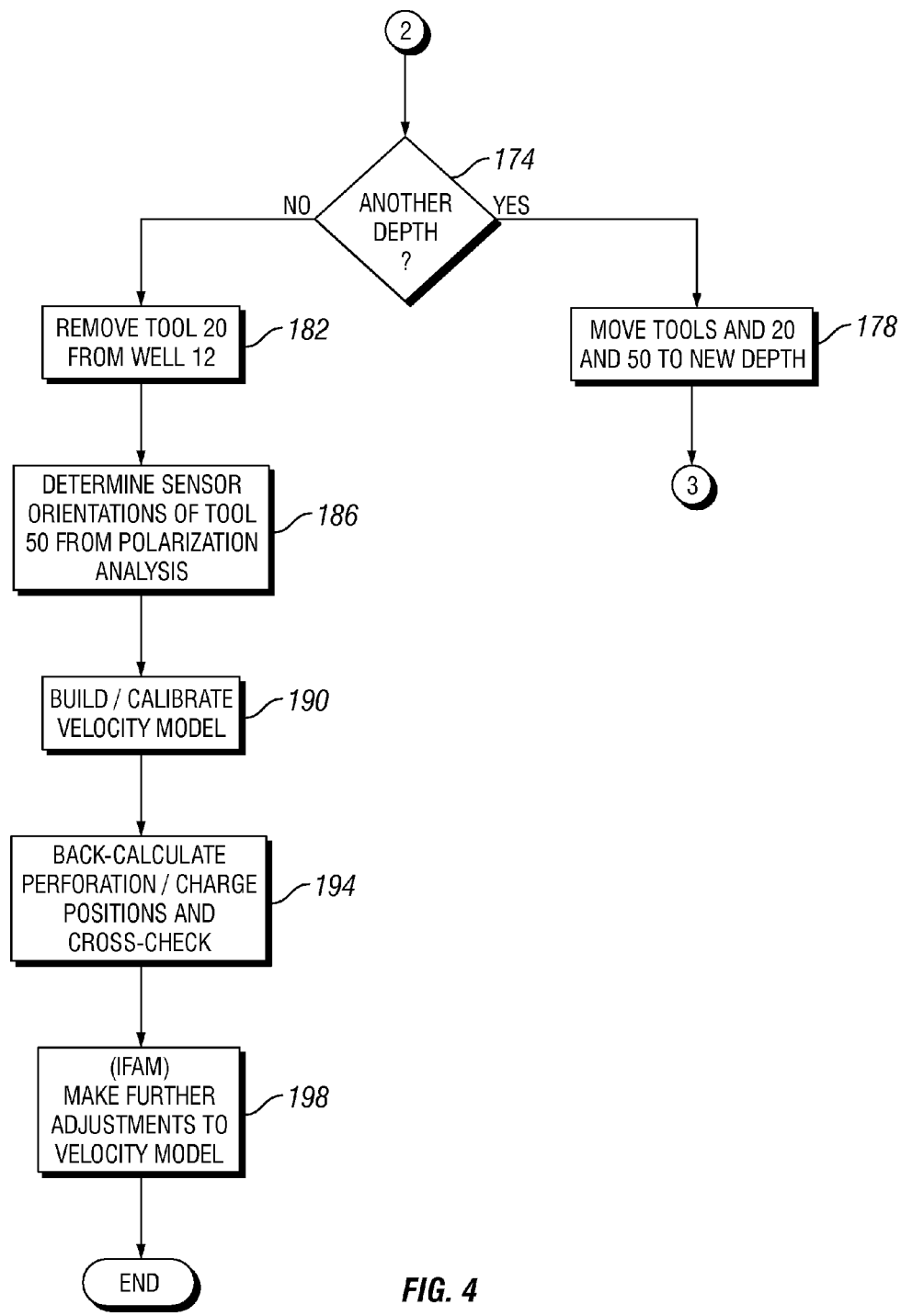

FIGS. 3 and 4 collectively depict a flow diagram that may be used for purposes of developing a velocity model using cross well seismic data that is recorded at different depths. In particular, FIG. 3 depicts a first portion 150A of the technique; and FIG. 4 depicts the remaining portion 150B.

Referring to FIG. 3, pursuant to the technique, a seismic receiver tool 50 is deployed in a monitoring well, pursuant to block 154. A seismic source tool 20 is deployed in a treatment well, pursuant to block 158. Measures are then undertaken to ensure (block 162) that the surface systems 34 and 70 are locked onto and are tracking the UTC time.

Next, a communication is made (block 166) from the treatment well 12 to the monitoring well 40 as to the intended firing time; and then, a command is sent to instruct the perforating gun 28 to fire, pursuant to block 166. In some embodiments of the invention, the intended firing time is translated to the time domain of the seismic receiving tool 50 and communicates to the tool 50 for purposes of controlling the precise time at which the tool 50 begins recording the seismic event. Seismic data that is generated during the event is then communicated (block 170) from both tools 20 and 50 to the surface and stored with timestamps.

Referring to FIG. 4, if a determination (diamond 174) is made that seismic data is to be collected at another depth, then the tools 20 and 50 are moved to a new depth, pursuant to block 178; and control returns to block 162 to repeat blocks 162, 166 and 170. Otherwise, if the measurements are complete, the tool 20 is removed from the well 12, pursuant to block 182. The sensor orientations of the tool 50 may then be determined (block 186) from polarization analysis. Next, a velocity model is built, and/or calibrated, pursuant to block 190. Perforation and/or charge positions are then back-calculated (block 194) and cross-checked. Based on the results of block 194, further adjustments may be made to the velocity model, pursuant to block 198.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

We claim:

1. A method comprising:
providing a source in a first well and a seismic receiver in the second well to detect a seismic event caused by the source, the source having a first clock and the receiver having a second clock;
referencing clocks in the source and receiver to a common reference time frame; and
determining a time in reference time frame at which seismic source generates seismic event, wherein the source comprises a first downhole clock, the receiver comprises a second downhole clock, and the act of synchronizing clocks comprises:
at the surface of the first well, synchronizing a first surface clock to the first downhole clock;
at the surface of the second well, synchronizing a second surface clock to the second downhole clock; and
synchronizing the first and second surface clocks.

2. The method of claim 1, further comprising:
synchronizing recording by the seismic receiver with the time.

3. The method of claim 1, wherein the act of synchronizing comprises causing a time at which the seismic source is activated to be substantially the same as a time at which the receiver is activated to record the event.

4. The method of claim 1, wherein the act of synchronizing the first and second surface clocks comprises:
synchronizing each of the first and second surface clocks to a clock signal obtained from a satellite.

5. The method of claim 1, wherein the act of referencing comprises:
periodically communicating an indication of the first downhole clock to the surface of the well.

6. The method of claim 1, wherein the act of providing the source comprises providing a perforating gun.

7. The method of claim 1, further comprising:
using the recording of the seismic event to generate an anisotropic velocity model.

8. The method of claim 1, wherein the seismic receiver is part of an array of seismic receivers, wherein the referencing comprises:
synchronizing recording of the seismic event by the array.

9. A system usable with a first well and a second well, comprising:
a first tool adapted to be run into the first well, the first tool comprising at least one seismic source and a first downhole clock;
a second tool adapted to be run into the second well, the second tool comprising at least one seismic receiver and a second downhole clock; and
circuitry to reference the first and second downhole clocks to a common reference clock to determine a time at which the first tool generates a seismic event,
wherein the circuitry comprises:
a first circuit located at the surface of the first well to synchronize a first surface clock to the first downhole clock; and
a second circuit located at the surface of the second well to synchronize a second surface clock to the second downhole clock.

10. The system of claim 9, wherein the circuitry is adapted to synchronize the recording of the seismic event by said at least one seismic receiver with a time at which said at least one seismic source generates the seismic event.

11. The system of claim 9, wherein the circuitry is synchronized to cause a time at which said at least one seismic source is activated to be substantially the same as a time at which said at least seismic receiver is activated to record the seismic event.

12. The system of claim 9, wherein the first and second circuits are adapted to each synchronize each of the first and second surface clocks to a clock signal that is received from a satellite.

13. The system of claim 9, wherein the first tool is adapted to periodically communicate an indication of the first downhole clock to the circuitry.

14. The system of claim 9, wherein the first tool comprises a perforating gun.

15. The system of claim 9, wherein the first tool is adapted to be run downhole on one of a wireline, slickline and a string.

16. The system of claim 9, wherein the seismic receiver is part of an array of seismic receivers adapted to record the seismic event.

* * * * *